(12) United States Patent
Onda

(10) Patent No.: US 9,612,626 B2
(45) Date of Patent: Apr. 4, 2017

(54) HINGE DEVICE AND ELECTRONIC DEVICE EQUIPPED WITH HINGE DEVICE

(71) Applicant: FUJITSU LIMITED, Kawasaki-shi, Kanagawa (JP)

(72) Inventor: Nobuhiko Onda, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 125 days.

(21) Appl. No.: 14/521,724

(22) Filed: Oct. 23, 2014

(65) Prior Publication Data
US 2015/0138713 A1   May 21, 2015

(30) Foreign Application Priority Data

Nov. 20, 2013  (JP) ................................ 2013-240384

(51) Int. Cl.
*G06F 1/16* (2006.01)

(52) U.S. Cl.
CPC .......... *G06F 1/1679* (2013.01); *G06F 1/1616* (2013.01); *G06F 1/1643* (2013.01); *G06F 1/1677* (2013.01); *G06F 1/1681* (2013.01)

(58) Field of Classification Search
CPC .... G06F 1/1641; G06F 1/1679; G06F 1/1616; G06F 1/1618; G06F 1/1643; G06F 1/1681; G06F 1/1677; H05K 5/0226; H05K 7/16; H05K 7/1471
USPC ............ 361/679.01, 679.15, 679.16, 679.26, 361/679.27, 679.28
See application file for complete search history.

(56) References Cited

U.S. PATENT DOCUMENTS

| | | | |
|---|---|---|---|
| 2005/0046374 A1 | 3/2005 | Ogawa et al. | |
| 2007/0150764 A1* | 6/2007 | Chen | G06F 1/1616 713/300 |
| 2009/0144934 A1* | 6/2009 | Kitagawa | G06F 1/1616 16/320 |
| 2010/0149764 A1* | 6/2010 | Ueyama | G06F 1/1681 361/749 |
| 2012/0188692 A1* | 7/2012 | Du | G06F 1/1616 361/679.01 |
| 2014/0070686 A1* | 3/2014 | Sip | G06F 1/1681 312/327 |
| 2014/0071648 A1* | 3/2014 | Sip | G06F 1/1615 361/809 |

(Continued)

FOREIGN PATENT DOCUMENTS

JP    2004-246497    9/2004

*Primary Examiner* — Courtney Smith
*Assistant Examiner* — Sagar Shrestha
(74) *Attorney, Agent, or Firm* — Staas & Halsey LLP

(57) ABSTRACT

A hinge device used in an electronic device used by opening a second housing from a closed state to a predetermined angle relative to a first housing, includes: a first housing connector configured to rotatably hold a hinge rotating shaft on the first housing; a second housing connector configured to fix the hinge rotating shaft to the second housing; a hinge torque generation mechanism provided in a connection between the first housing connector and the second housing connector and configured to generate a predetermined rotation torque between the hinge rotating shaft and the first housing connector; a hinge lock mechanism provided on the first housing side and configured to restrain rotation of the hinge rotating shaft in response to input of a lock signal; and a control unit capable of generating the lock signal to the hinge lock mechanism.

16 Claims, 13 Drawing Sheets

(56) References Cited

U.S. PATENT DOCUMENTS

2014/0098474 A1* 4/2014 Bhowmik ............. G06F 1/1616
　　　　　　　　　　　　　　　　　　　　　361/679.01
2014/0146484 A1* 5/2014 Chen .................... G06F 1/1616
　　　　　　　　　　　　　　　　　　　　　361/728

* cited by examiner

HINGE DEVICE AND ELECTRONIC DEVICE EQUIPPED WITH HINGE DEVICE

CROSS-REFERENCE TO RELATED APPLICATION

This application is based upon and claims the benefit of priority of the prior Japanese Patent Application No. 2013-240384, filed on Nov. 20, 2013, the entire contents of which are incorporated herein by reference.

FIELD

The embodiment discussed herein is related to a hinge device and an electronic device equipped with the hinge device.

BACKGROUND

Information equipment such as a laptop personal computer and a portable telephone includes one that includes a main body unit with input keys and a display unit in which the display unit is rotatably connected to the main body unit with a hinge mechanism, and is used by opening and closing the display unit. FIG. 1A illustrates the location of a hinge device 10 in a laptop personal computer 1 including a main body unit 1M and a display unit 1D. FIG. 1B is an enlarged view of a section of the hinge device 10 in the laptop personal computer 1 illustrated in FIG. 1A. FIG. 1C illustrates the hinge device 10 taken out of the laptop personal computer illustrated in FIG. 1B.

The hinge device 10 illustrated in FIG. 1C includes a main body connector 2 and a display connector 3 as illustrated in FIG. 1D. A hinge rotating shaft 4 provided in the display connector 3 is rotatably held on a bracket 5 protruded from the main body connector 2. The hinge rotating shaft 4 is inserted through a ring-shaped friction plate 6 and then inserted through a holding hole 5H of the bracket 5. Between a free end 4E of the inserted hinge rotating shaft 4 and the bracket 5, a ring-shaped friction plate 6 and multiple disc springs 7 are inserted from the bracket 5 side. Then, a pressure plate 8 is attached to the free end 4E of the hinge rotating shaft 4 in a state where the disc springs 7 are compressed. Thus, a hinge torque generator 9 is formed. Note that the friction plate 6 is fixed to the hinge rotating shaft 4 using a key groove or the like, and is rotated in synchronization with the rotation of the hinge rotating shaft 4.

The hinge torque generator 9 uses spring force generated by the compression of the disc springs 7 with the pressure plate 8 to allow a side surface of the friction plate 6 adjacent to the disc springs 7 to come into pressure contact with one side surface of the bracket 5 on the main body connector 2, and also allow a side surface of the friction plate 6 adjacent to the main body connector 2 to come into pressure contact with the other side surface of the bracket 5. The pressure contact between the two friction plates 6 and the bracket 5 on the main body connector 2 causes friction force between the main body connector 2 and the display connector 3, thereby generating hinge torque. The hinge torque can hold the display unit 1D at a given open angle when the display unit 1D is opened relative to the main body unit 1M (free-stop function).

Note that Japanese Laid-open Patent Publication No. 2004-246497 discloses an information processor that is a laptop personal computer as illustrated in FIG. 1A and configured to reduce hinge torque upon receipt of a friction resistance reduction instruction from a user, when changing the open angle of the display unit from the given open angle to another open angle.

Meanwhile, there has recently been put to practical use a laptop personal computer 1 equipped with a touch panel display 1T in a display unit 1D and capable of menu selection, character input and the like by touch operations to the touch panel display 1T as illustrated in FIG. 2A.

The touch panel display 1T is hereinafter simply described as the touch panel 1T. In such a laptop personal computer 1, menu selection, character input and the like are performed by touching the touch panel 1T in the display unit 1D.

However, the hinge device 10 having the structure described with reference to FIGS. 1A to 1D, the hinge torque generator 9 has a spring element, a torsion element and the like. Therefore, when a touch operation is performed on the touch panel 1T in the display unit 1D, a touch operation torque acting on the hinge rotating shaft 4 in the hinge device 10 rotates the hinge rotating shaft 4, causing the display unit 1D to vibrate in opening and closing directions. When the display unit 1D vibrates during the touch operation to the touch panel 1T as described above, there is a problem that steadiness is lost and thus operability of the touch operation is impaired.

FIG. 2B illustrates a configuration of a vibration measurement system 90 configured to measure vibration of the display unit 1D when a touch operation is performed at a position distant from the hinge rotating shaft 4 by a predetermined distance L, for example, 200 mm on the touch panel 1T in the laptop personal computer 1 illustrated in FIG. 2A. The vibration measurement system 90 includes a laser generator 91, a laser receiver 92 and a vibration detector 93 connected to the laser receiver 92. During measurement, the back side of the display unit 1D is irradiated with laser light from the laser generator 91, and a touch operation is performed in a state where reflected light is received by the laser receiver 92. Then, a degree of vibration of the display unit 1D during the touch operation is actually measured by the vibration detector 93 measuring a change in reflection angle of the laser light in this state.

FIG. 2C is a graph illustrating an oscillatory waveform of the display unit 1D, which is measured by the vibration detector 93 illustrated in FIG. 2B, during a touch operation on the touch panel 1T. The first peak of the waveform is displacement of the display unit 1D due to the touch operation, and the oscillatory waveform after the second peak is residual vibration of the display unit 1D after a finger is removed from the touch panel 1T. As can be seen from FIG. 2C, the vibration of the display unit 1D lasts several seconds with decreasing displacement even after the touch operation is finished and the finger is removed from the touch panel 1T.

In order to suppress the vibration of the display unit 1D during the touch operation on the touch panel 1T as described above, a countermeasure is conceivable to increase the friction force of the hinge torque generator 9 illustrated in FIGS. 1C and 1D. However, when the friction force of the hinge torque generator 9 is increased, a large force has to be used to open and close the display unit 1D. For this reason, it feels heavy to open and close the display unit 1D, leading to a new problem of poor operability.

SUMMARY

According to an aspect of the invention, a hinge device used in an electronic device used by opening a second housing from a closed state to a predetermined angle relative to a first housing, includes: a first housing connector configured to rotatably hold a hinge rotating shaft on the first housing; a second housing connector configured to fix the hinge rotating shaft to the second housing; a hinge torque generation mechanism provided in a connection between the first housing connector and the second housing connector and configured to generate a predetermined rotation torque between the hinge rotating shaft and the first housing connector; a hinge lock mechanism provided on the first housing side and configured to restrain rotation of the hinge rotating shaft in response to input of a lock signal; and a control unit capable of generating the lock signal to the hinge lock mechanism.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

Figure 1A:
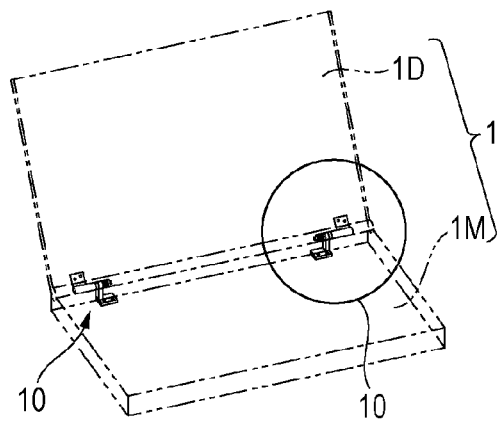
FIG. 1A is a diagram illustrating a position of a hinge device in a laptop personal computer of a comparative technology.
Figure 1B:
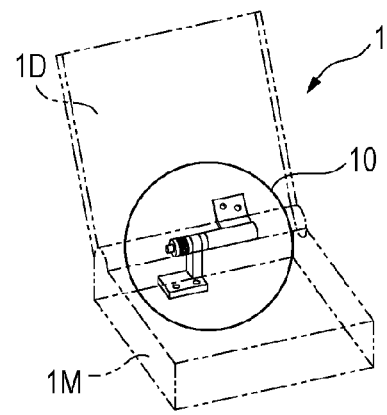
FIG. 1B is an enlarged view of a section of the hinge device in the laptop personal computer illustrated in FIG. 1A.
Figure 1C:
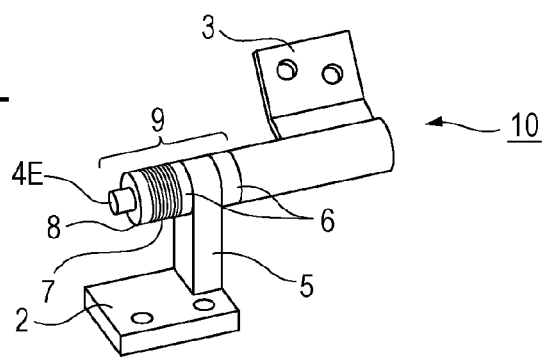
FIG. 1C is a perspective view illustrating the hinge device taken out of the laptop personal computer illustrated in FIG. 1B.
Figure 1D:
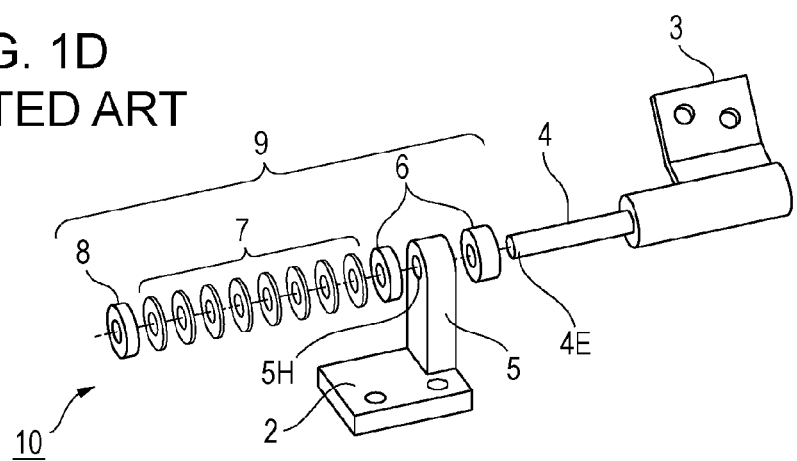
FIG. 1D is an exploded perspective view of the hinge device illustrated in FIG. 1C.
Figure 2A:
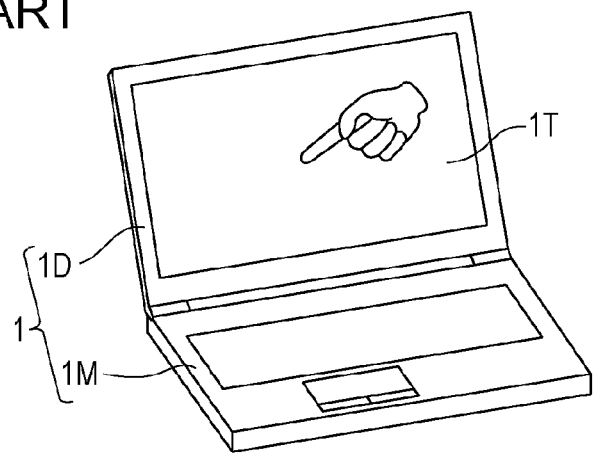
FIG. 2A is a perspective view of a laptop personal computer including a touch panel.

Hereinafter, with reference to the accompanying drawings, an embodiment is described in detail based on specific examples. Note that, in the following description, the same reference numerals are used to denote the same members as those used in the hinge device 10 of the comparative technology described with reference to FIGS. 1A to 2C. In examples described below, a laptop personal computer with a touch panel is described as an example of an electronic device with a built-in hinge device. Again, the reference numerals used in the discussion of the laptop personal computer 1 illustrated in FIG. 2A are likewise used with no change.

Figure 3A:
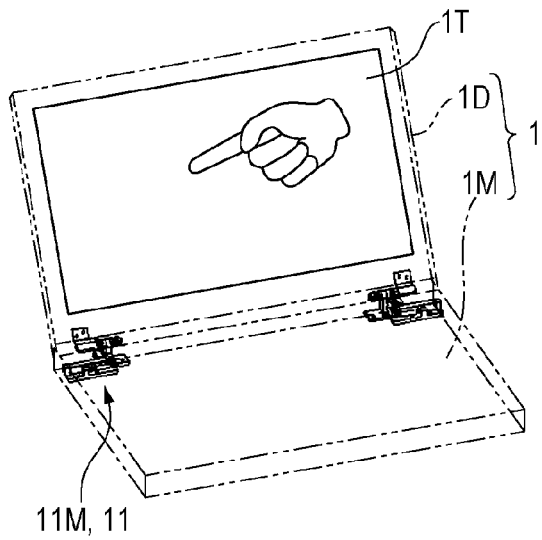
FIG. 3A is a diagram illustrating the location of a mechanism system in a hinge device according to a first example of an embodiment, which is mounted on a laptop personal computer with a touch panel.

FIG. 3A illustrates a laptop personal computer 1 including a hinge device 11 according to a first example of the embodiment. The laptop personal computer 1 includes a main body unit 1M and a display unit 1D with a touch panel 1T. A mechanism system 11M in the hinge device 11 enables the display unit 1D to open and close relative to the main body unit 1M. Note that the hinge device according to the embodiment, including the first example, includes: the mechanism system configured to open and close the display unit 1D relative to the main body unit 1M; and a control system configured to control the mechanism system.

Figure 3B:
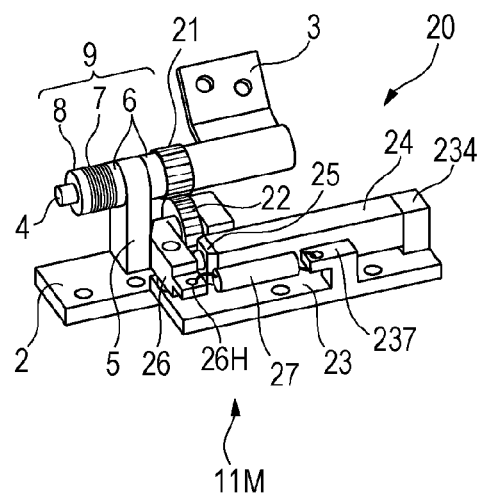
FIG. 3B is a perspective view illustrating the mechanism system taken out of the hinge device illustrated in FIG. 3A.
Figure 3C:
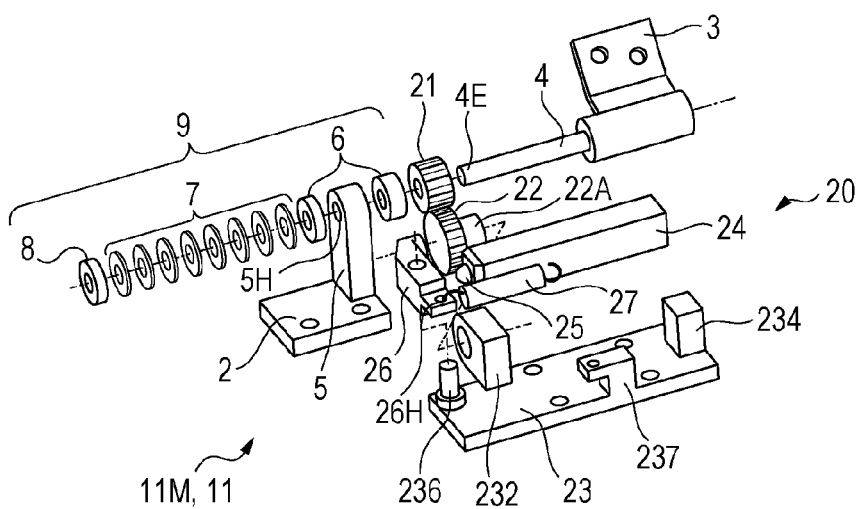
FIG. 3C is an exploded perspective view of the mechanism system in the hinge device illustrated in FIG. 3B.

FIG. 3B is a perspective view illustrating the mechanism system 11M taken out of the hinge device 11 illustrated in FIG. 3A. FIG. 3C is an exploded perspective view of the mechanism system 11M in the hinge device 11 illustrated in FIG. 3B. The mechanism system 11M in the hinge device 11 according to the first example includes a main body connector 2 and a display connector 3. A hinge rotating shaft 4 provided in the display connector 3 is rotatably held on a bracket 5 protruded from the main body connector 2. The hinge rotating shaft 4 is inserted through a first gear 21 and a ring-shaped friction plate 6, and then inserted through a holding hole 5H of the bracket 5. Between a free end 4E of the inserted hinge rotating shaft 4 and the bracket 5, a ring-shaped friction plate 6 and multiple disc springs 7 are inserted from the bracket 5 side. Then, a pressure plate 8 is attached to the free end 4E of the hinge rotating shaft 4 in a state where the disc springs 7 are compressed. Thus, a hinge torque generator 9 is formed. Note that the first gear 21 and the friction plate 6 are fixed to the hinge rotating shaft 4, and are rotated in synchronization with the rotation of the hinge rotating shaft 4.

The hinge torque generator 9 uses spring force generated by the compression of the multiple disc springs 7 with the pressure plate 8 to allow a side surface of the friction plate 6 adjacent to the disc springs 7 to come into pressure contact with one surface of the bracket 5 on the main body connector 2, and also allow a side surface of the friction plate 6 adjacent to the main body connector 2 to come into pressure contact with the other surface of the bracket 5. The pressure contact between the two friction plates 6 and the bracket 5 on the main body connector 2 causes friction force between the main body connector 2 and the display connector 3, thereby generating hinge torque. The hinge torque can hold the display unit 1D at a given open angle when the display unit 1D is opened relative to the main body unit 1M.

In the mechanism system 11M of the hinge device 11 according to the first example, a hinge lock mechanism 20 configured to lock the rotation of the first gear 21 fixed to the hinge rotating shaft 4 is provided adjacent to the hinge rotating shaft 4, in addition to the above configuration. The hinge lock mechanism 20 includes a second gear 22, a base plate 23, a piezoelectric element 24, a pressure protrusion 25, a pressure lever 26 and a return spring 27. The pressure lever 26 is made of metal and configured to increase the amount of displacement of the piezoelectric element 24. The base plate 23 is fixed to the main body unit 1M of the laptop personal computer 1. On the base plate 23, a bearing 232 into which a rotating shaft 22A of the second gear 22 is inserted, an end plate 234 to which an end of the piezoelectric element 24 is attached, a rotating shaft 236 of the pressure lever 26, and a hook protrusion 237 to lock one end of the return spring 27 are provided.

When the base plate 23 is fixed to the main body unit 1M and the rotating shaft 22A of the second gear 22 is attached to the bearing 232, the second gear 22 is engaged with the first gear 21 and rotated in synchronization with the rotation of the first gear 21. The pressure lever 26 is rotatably attached to the rotating shaft 236 protruded from the base plate 23. A hook hole 26H is provided in an end of the pressure lever 26 on the side far from the second gear 22. The return spring 27 is hung between the hook hole 26H and the hook protrusion 237 protruded from the base plate 23. An end of the pressure lever 26 on the side closer to the second gear 22 is bent toward the second gear 22, and has a pressure surface facing the second gear 22 at its tip.

When the end of the pressure lever 26 on the side closer to the second gear 22 is rotated toward the second gear 22, the pressure surface comes into pressure contact with a side surface of the second gear 22. A friction member that reduces rotation of the pressure surface during the pressure contact with the side surface of the second gear 22, for example, a member made of the same material as that of a brake shoe in brake equipment can be attached to the pressure surface. In the state where the return spring 27 is hung between the hook hole 26H of the pressure lever 26 and the hook protrusion 237 protruded from the base plate 23, the pressure surface of the pressure lever 26 is located at a position distant from the side surface of the second gear 22.

The piezoelectric element 24 is fixed by having one end thereof attached to the end plate 234 protruded from the base plate 23, and the pressure protrusion 25 is attached to a free end thereof. The pressure protrusion 25 is located at a position facing a portion between the rotating shaft 236 and the hook hole 26H of the pressure lever 26. However, in a state where no power is conducted to the piezoelectric element 24, the pressure protrusion 25 is located at a position in close contact but not in pressure contact with the pressure lever 26. In other words, in order to allow the pressure lever 26 to come into close contact with the pressure protrusion 25 in the state where no power is conducted to the piezoelectric element 24, the return spring 27 is hung between the hook hole 26H provided in the pressure lever 26 and the hook protrusion 237 protruded from the base plate 23.

The piezoelectric element 24 is a stacked piezoelectric element formed by stacking multiple piezoelectric elements in a state where each of the piezoelectric elements is sandwiched between electrodes. When a voltage is applied between the electrodes, each of the piezoelectric elements is elongated, leading to an increase in overall length of the piezoelectric element 24. Since one end of the piezoelectric element 24 is fixed to the end plate 234, when a voltage is applied between the electrodes, the piezoelectric element 24 is elongated and extended toward the pressure lever 26, and the pressure protrusion 25 at the free end thereof pushes the pressure lever 26 to rotate. Note that the piezoelectric element 24 is an example of an actuator to rotate the pressure lever 26. Other examples of such an actuator, other than the piezoelectric element 24, include an actuator using a solenoid and a plunger, and the like.

Figure 4A:
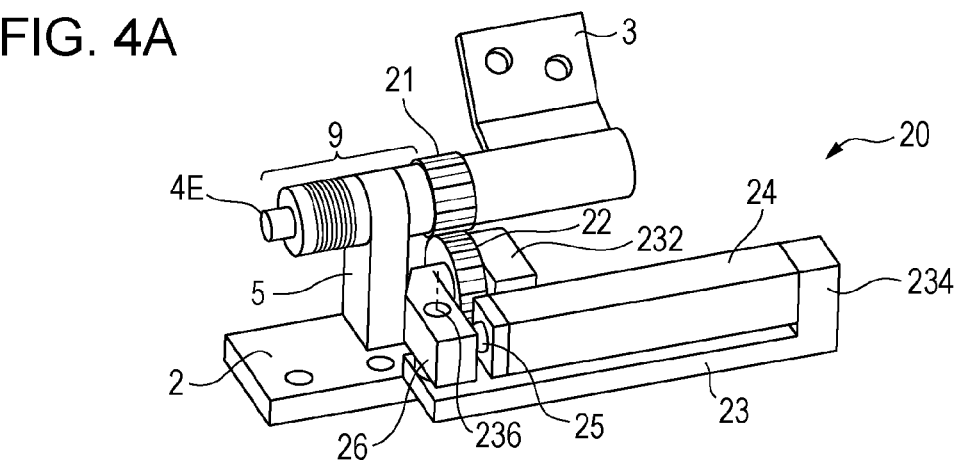
FIG. 4A is a perspective view illustrating a main part of the hinge device according to the first example of the embodiment.
Figure 4B:
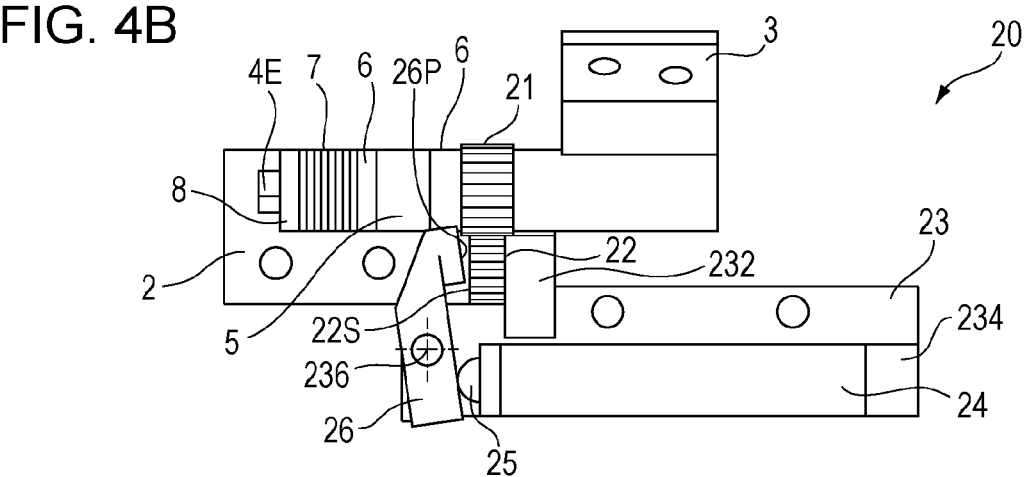
FIG. 4B is a plan view illustrating a state where no power is conducted to the hinge device illustrated in FIG. 4A.
Figure 4C:
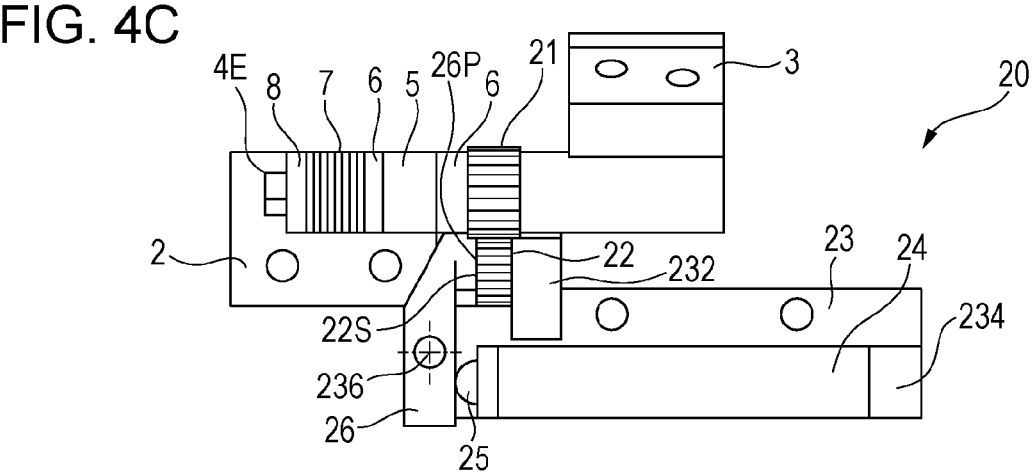
FIG. 4C is a plan view illustrating a state where power is conducted to the hinge device illustrated in FIG. 4A.

Here, with reference to FIGS. 4A to 4C, description is given of an operation of elongating the piezoelectric element 24 to rotate the pressure lever 26. FIG. 4A illustrates a main part of the hinge device 11 according to the first example of the embodiment illustrated in FIG. 3A, while excluding the section of the return spring 27 from the mechanism system 11M. FIG. 4B is a plan view illustrating a state where no power is conducted to the piezoelectric element 24 in the mechanism system 11M of the hinge device 11 illustrated in FIG. 4A. When no power is conducted to the piezoelectric element 24, the pressure protrusion 25 is in a state of coming in close contact but not in pressure contact with the pressure lever 26. In this state, a pressure surface 26P of the pressure lever 26 is located at a position distant from a side surface 22S of the second gear 22. Therefore, when the display connector 3 is rotated and the first gear 21 is rotated, the second gear 22 engaged with the first gear 21 is rotated in a direction opposite to the rotation direction of the first gear 21.

On the other hand, when power is conducted to the piezoelectric element 24, the piezoelectric element 24 is elongated to move the pressure protrusion 25 toward the pressure lever 26. Thus, the pressure lever 26 is pushed by the pressure protrusion 25. The pressure lever 26 pushed by the pressure protrusion 25 is rotated about the rotating shaft 236, and firmly presses the pressure surface 26P against the side surface 22S of the second gear 22. This state is illustrated in FIGS. 4A and 4C. The pressure surface 26P of the pressure lever 26 may be made of the same material as that of the pressure lever 26. However, if the same material as that of the brake shoe as described above is used for the pressure surface 26P, braking force of the pressure lever 26 relative to the side surface 22S of the second gear 22 is increased. The braking force of the pressure surface 26P of the pressure lever 26 disables the rotation of the second gear 22.

When the braking force of the pressure lever 26 restrains the second gear 22 from rotating, the first gear 21 engaged with the second gear 22 can also no longer be rotated. Then, the hinge rotating shaft 4 to which the first gear 21 is attached is also set in a restrained state. As a result, even when the display unit is pressed by a touch operation on the touch panel, the display connector 3 in the mechanism system 11M of the hinge device 11 that holds the display unit does not rock, vibration of the display unit is suppressed.

Figure 5:
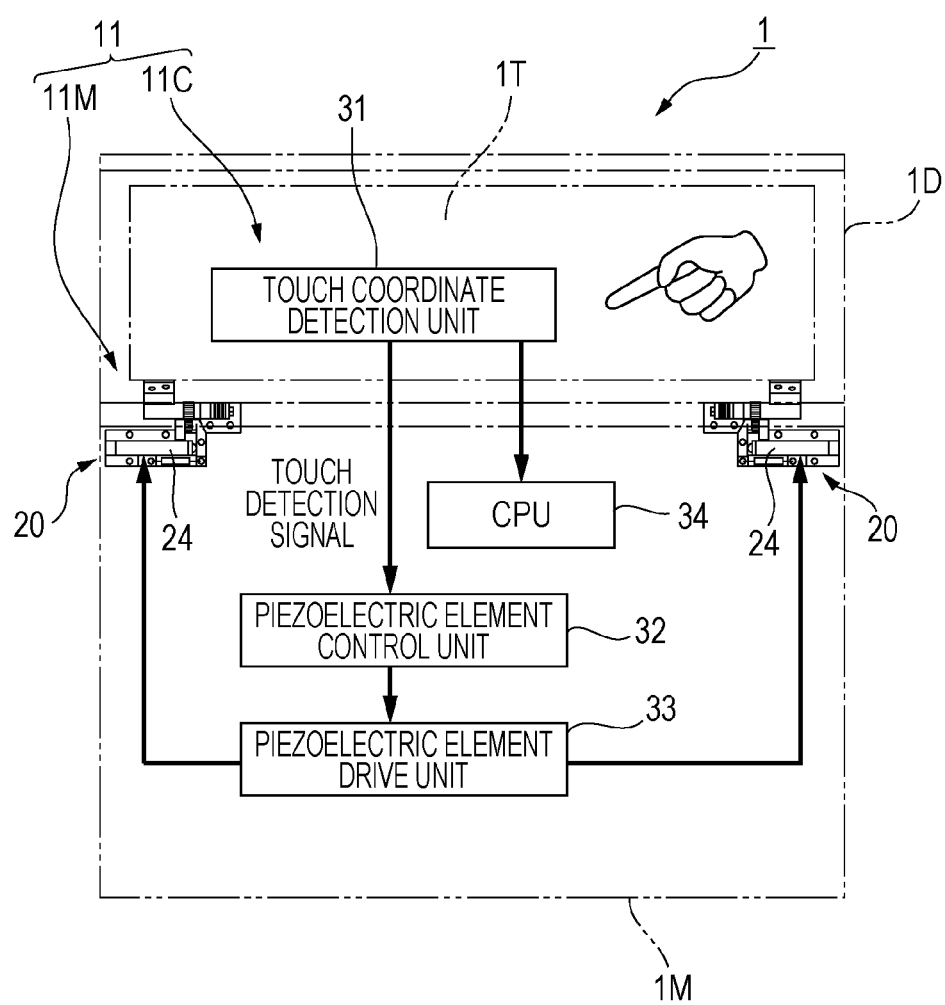
FIG. 5 is a block circuit diagram illustrating a configuration example of a control system in the hinge device according to the first example of the embodiment, which is mounted on the laptop personal computer with the touch panel.

FIG. 5 illustrates a configuration example of a control system 11C to control operations of the mechanism system 11M in the hinge device 11 according to the first example of the embodiment, which is mounted on the laptop personal computer 1 with the touch panel 1T. The control system 11C includes a touch coordinate detection unit 31, a piezoelectric element control unit 32 and a piezoelectric element drive unit 33. The touch coordinate detection unit 31 is also connected to a CPU 34 to perform control of the laptop personal computer 1. The touch coordinate detection unit 31 is provided in the touch panel 1T, and an output from the touch coordinate detection unit 31 is inputted to the CPU 34. The CPU 34 performs an operation corresponding to touch coordinates.

When the touch panel 1T is a capacitance type touch panel, the touch coordinate detection unit 31 can output a touch detection signal before a finger that performs a touch operation touches the touch panel 1T by detecting a change in capacitance of the touch panel 1T due to approach of the finger. The touch detection signal outputted by the touch coordinate detection unit 31 is inputted to the piezoelectric element control unit 32, and then a signal to drive the piezoelectric element is inputted to the piezoelectric element drive unit 33 from the piezoelectric element control unit 32. Upon receipt of the signal to drive the piezoelectric element, the piezoelectric element drive unit 33 elongates the piezoelectric element 24 in the hinge lock mechanism 20 by applying a voltage thereto, and thus locks the hinge rotating shaft 4 in the mechanism system 11M of the hinge device 11.

Alternatively, when the touch panel 1T is a pressure-sensitive touch panel, the touch coordinate detection unit 31 can output a touch detection signal by detecting a change in pressure when a finger that performs a touch operation touches the touch panel 1T. The timing of the touch detection signal being outputted from the touch coordinate detection unit 31 is slower for the pressure-sensitive touch panel than for the capacitance type touch panel. However, also in this case, the piezoelectric element 24 in the hinge lock mechanism 20 can be elongated by applying a voltage thereto before the display unit 1D vibrates in response to a touch operation to the touch panel 1T. Thus, the vibration of the display unit is suppressed.

Figure 6:
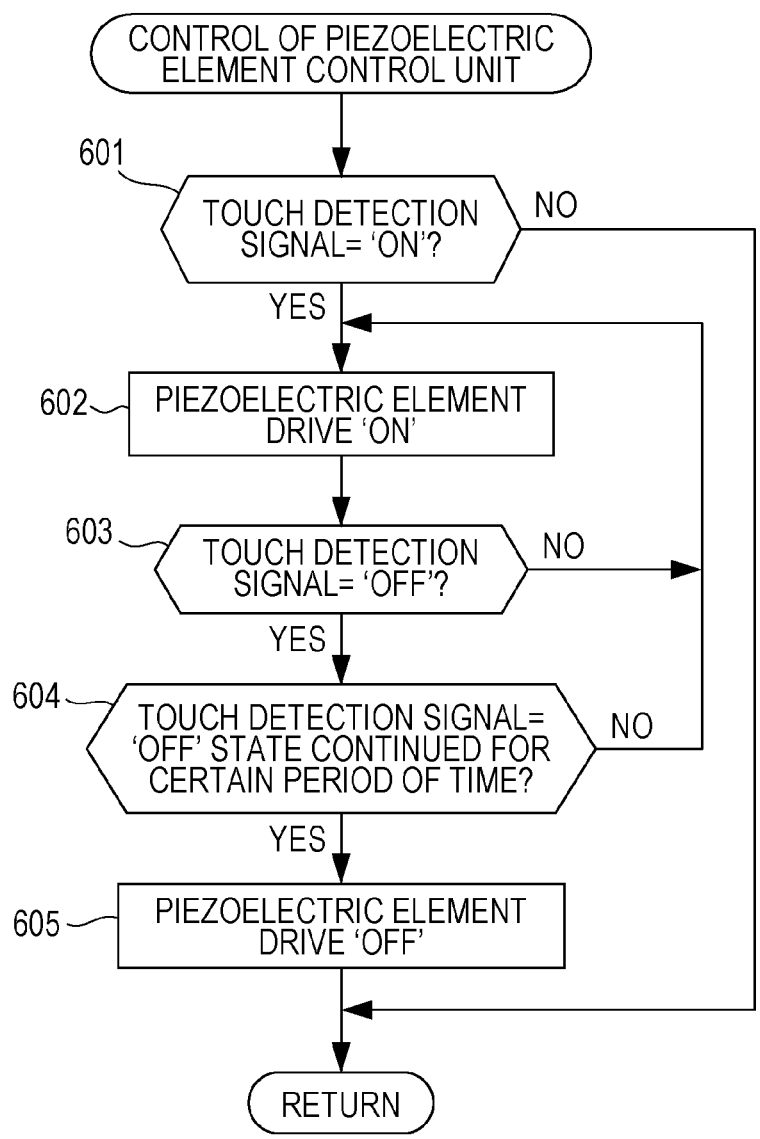
FIG. 6 is a flowchart illustrating an example of control by a piezoelectric element control unit in the control system illustrated in FIG. 5.

Here, description is given of operations of the piezoelectric element control unit 32 locking and unlocking the mechanism system 11M in the hinge device 11 by applying a voltage to the piezoelectric element 24 in the hinge lock mechanism 20. FIG. 6 is a flowchart illustrating an example of control by the piezoelectric element control unit 32 in the control system 11C illustrated in FIG. 5. In the following description, it is assumed that a touch detection signal to be outputted from the touch coordinate detection unit 31 is turned "ON" upon detection of a touch operation by the touch coordinate detection unit 31, while the touch detection signal to be outputted from the touch coordinate detection unit 31 is turned "OFF" upon detection of no touch operation.

In Step 601, it is determined whether or not the touch detection signal from the touch coordinate detection unit 31 is "ON". When it is determined in Step 601 that the touch detection signal is "ON" (YES), the routine advances to Step 602 to drive ("ON") the piezoelectric element. On the other hand, when it is determined in Step 601 that the touch detection signal is not "ON", the routine is terminated and the control is executed again after a predetermined time. Meanwhile, in Step 603 after the drive ("ON") of the piezoelectric element, it is determined whether or not the touch detection signal from the touch coordinate detection unit 31 is turned "OFF". When the touch detection signal from the touch coordinate detection unit 31 is not turned "OFF" (NO) in Step 603, the routine returns to Step 602 to continue the drive ("ON") of the piezoelectric element.

On the other hand, when it is determined in Step 603 that the touch detection signal is turned "OFF" (YES), the routine advances to Step 604. In Step 604, it is determined whether or not the "OFF" state of the touch detection signal is continued for a certain period of time. When the "OFF" state of the touch detection signal is not continued for a certain period of time, the routine returns to Step 602 to continue the drive ("ON") of the piezoelectric element. On the other hand, when it is determined in Step 604 that the "OFF" state of the touch detection signal is continued for a certain period of time, the routine advances to Step 605 to stop ("OFF") the drive of the piezoelectric element, and then the routine is terminated.

By the above control, the drive of the piezoelectric element is turned "ON" when the touch detection signal is turned "ON", while the drive of the piezoelectric element is turned "OFF" when a certain period of time passes after the touch detection signal is turned "OFF". This control enables smooth opening and closing operations when the display unit is opened and closed relative to the main body unit of the laptop computer. Thus, vibration of the display unit is suppressed when a touch operation is performed in a state where the display unit is opened.

Figure 7:
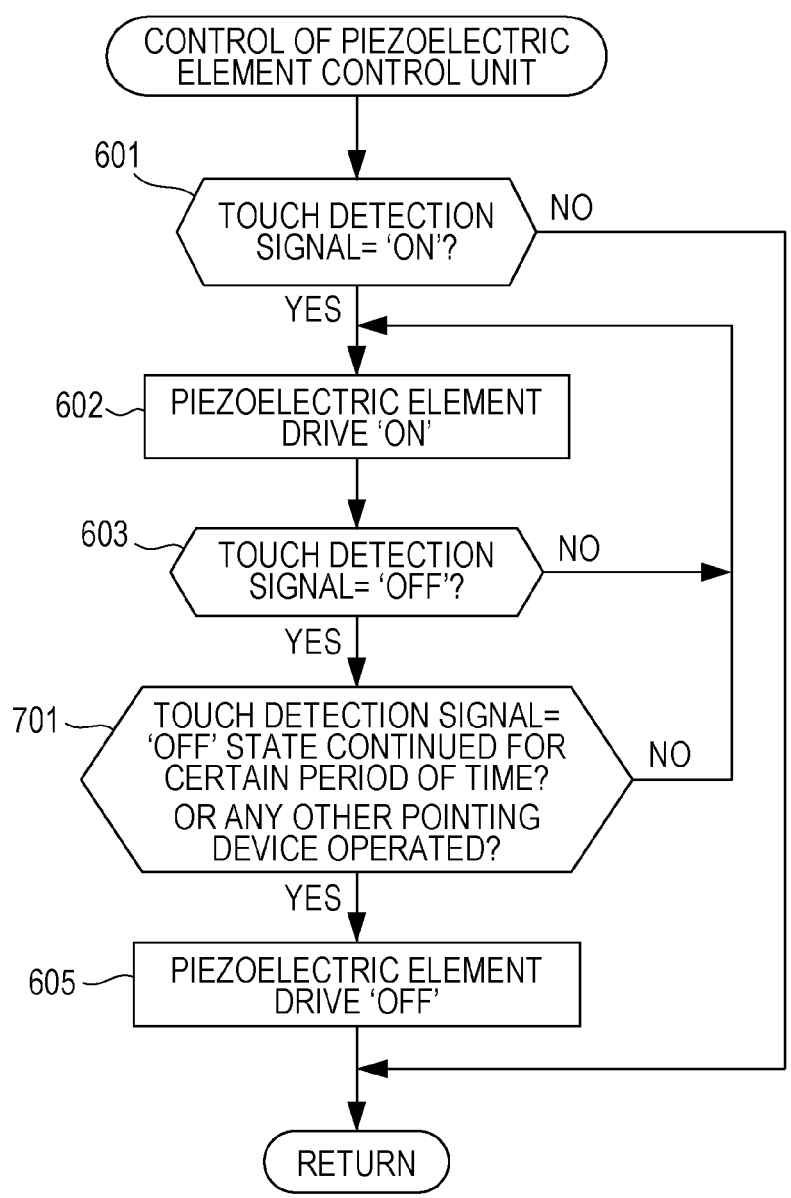
FIG. 7 is a flowchart illustrating another example of control by the piezoelectric element control unit in the control system illustrated in FIG. 5.

Next, description is given of another control example for the operations of the piezoelectric element control unit 32 locking and unlocking the mechanism system 11M in the hinge device 11 by applying a voltage to the piezoelectric element 24 in the hinge lock mechanism 20. FIG. 7 is a flowchart illustrating another example of the control by the piezoelectric element control unit 32 in the control system 11C illustrated in FIG. 5. The control illustrated in FIG. 7 is different from that described with reference to FIG. 6 only in control after it is determined in Step 603 that the touch detection signal is turned "OFF". Thus, the same control steps are denoted by the same step numbers and description thereof is omitted.

In the control example described with reference to FIG. 6, the piezoelectric element is driven ("ON") until the "OFF" state of the touch detection signal is continued for a certain period of time in Step 604 after it is determined in Step 603 that the touch detection signal is turned "OFF". On the other hand, in the control example illustrated in FIG. 7, two kinds of determinations to stop ("OFF") the drive of the piezoelectric element are performed in Step 701 after it is determined in Step 603 that the touch detection signal is turned "OFF". A first determination is to determine whether or not the "OFF" state of the touch detection signal is continued for a certain period of time as the control example described with reference to FIG. 5.

A second determination is to determine whether or not another pointing device, for example, a mouse or a trackball is operated after the touch detection signal is set in the "OFF" state. The operation of another pointing device means that no more touch operations are to be performed. Therefore, in this case, the drive of the piezoelectric element is immediately stopped ("OFF"). In other words, in the control example illustrated in FIG. 7, two kinds of determinations are performed after the touch detection signal is turned "OFF", and then the drive of the piezoelectric element is stopped ("OFF") based on the result of the first or second determination, whichever comes first.

Figure 8:
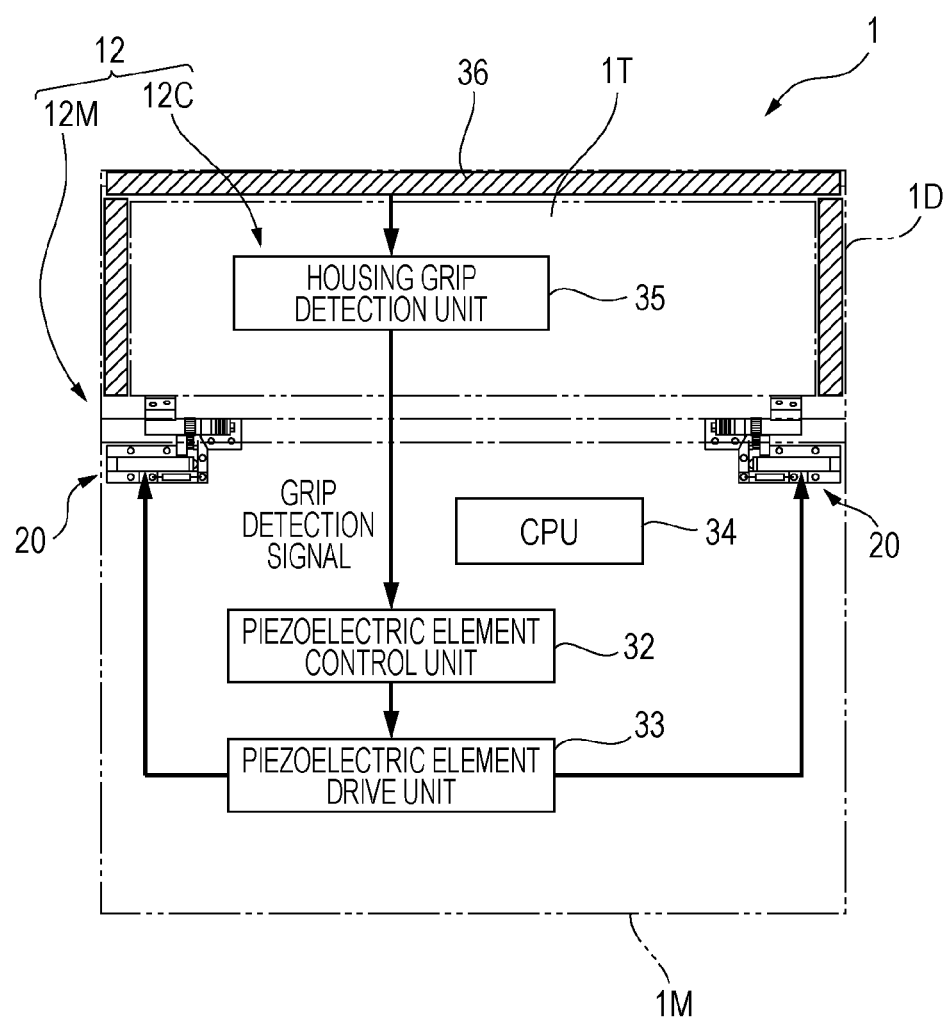
FIG. 8 is a block circuit diagram illustrating a configuration example of a control system in a hinge device according to a second example of the embodiment, which is mounted on a laptop personal computer with a touch panel.

FIG. 8 illustrates a configuration example of a control system 12C to control operations of a mechanism system 12M in a hinge device 12 according to a second example of the embodiment, which is mounted on the laptop personal computer 1 with the touch panel 1T. The mechanism system 12M has exactly the same structure as that of the mechanism system 11M in the hinge device 11 according to the first example. The control system 12C includes a housing grip detection unit 35, a piezoelectric element control unit 32 and a piezoelectric element drive unit 33. A pressure-sensitive sensor 36 is provided in the periphery of three sides, except for the side connected to the main body unit 1M, of a housing of the display unit 1D in the laptop personal computer 1. The housing grip detection unit 35 is connected to the pressure-sensitive sensor 36.

When opening and closing the display unit 1D in the laptop personal computer 1 relative to the main body unit 1M, generally, the periphery of the display unit 1D is grabbed. Therefore, when the periphery of the display unit 1D is grabbed to open and close the display unit 1D relative to the main body unit 1M, hinge torque of the mechanism system 12M in the hinge device 12 is preferably small. For this reason, the hinge device 12 according to the second example reduces the hinge torque of the mechanism system 12M only when the display unit 1D is opened and closed relative to the main body unit 1M, and suppresses the vibration of the display unit 1D by fixing the first gear with the hinge lock mechanism 20 when the opening and closing operations are finished.

In the laptop personal computer 1 using the hinge device 12 according to the second example, the mechanism system 12M may not include a hinge torque to hold the display unit 1D at a given open angle when the display unit 1D is opened relative to the main body unit 1M. In addition, the mechanism system 12M may also not include a touch operation detection system to provide the mechanism system 12M in the hinge device 12 with a large hinge torque to suppress the vibration during a touch operation. This is because, when an operator finishes opening the display unit 1D relative to the main body unit 1M and removes his/her hand from the periphery of the display unit 1D, the hinge lock mechanism 20 is operated to hold the display unit 1D at a tilt angle at that moment. Accordingly, the hinge torque when the control system 12C unlocks the mechanism system 12M can be set smaller than that of the mechanism system 11M in the hinge device 11 according to the first example.

Figure 9:
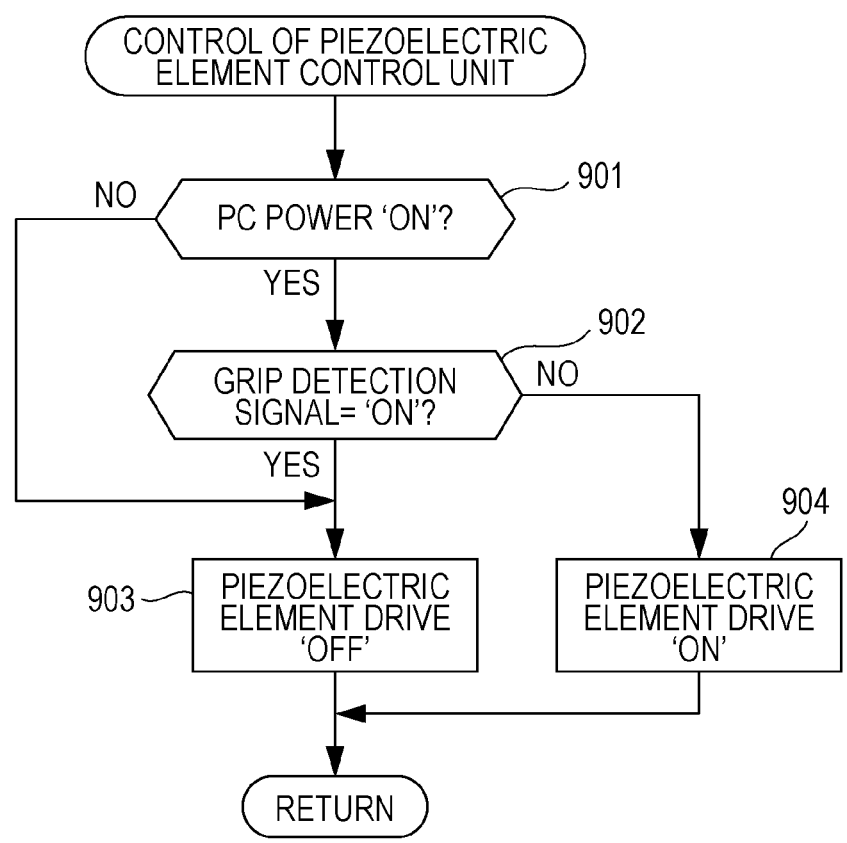
FIG. 9 is a flowchart illustrating an example of control by a piezoelectric element control unit in the control system illustrated in FIG. 8.

FIG. 9 is a flowchart illustrating an example of control by the piezoelectric element control unit 32 in the control system 12C of the hinge device 12 according to the second example illustrated in FIG. 8. In Step 901, it is determined whether or not the laptop personal computer 1 (described as PC in FIG. 9) is turned ON. When the laptop personal computer 1 is not turned ON (NO), the routine advances to Step 903 to stop ("OFF") the drive of the piezoelectric element.

On the other hand, when the laptop personal computer 1 is ON, the routine advances to Step 902 to determine whether the housing grip detection unit 35 has detected a grip detection signal "ON" (YES) or not detected the grip detection signal "ON" (NO). When the grip detection signal "ON" is detected (YES), the display unit is opened or closed. Thus, the routine advances to Step 903 to stop ("OFF") the drive of the piezoelectric element. On the other hand, when the grip detection signal "ON" is not detected (NO) in Step 902, the routine advances to Step 904 to drive ("ON") the piezoelectric element.

Note that sometimes the display unit 1D is opened from the main body unit 1M in the OFF state of the laptop personal computer 1 and is closed when the laptop personal computer 1 is turned OFF. In such a case, Step 901 in the control procedures illustrated in FIG. 9 can be omitted.

Figure 2B:
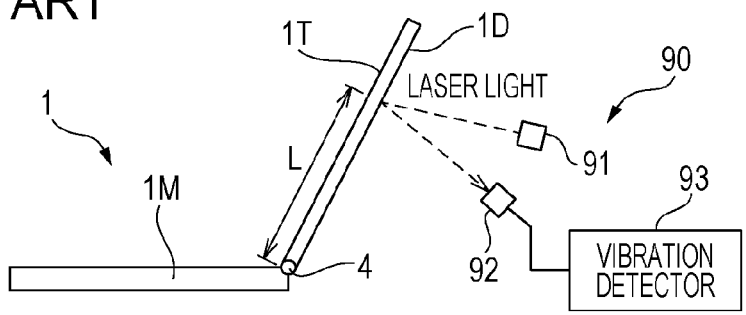
FIG. 2B is a diagram illustrating a configuration example of a vibration measurement system to measure the vibration of a display unit when the touch panel of the laptop personal computer illustrated in FIG. 2A is operated.
Figure 2C:
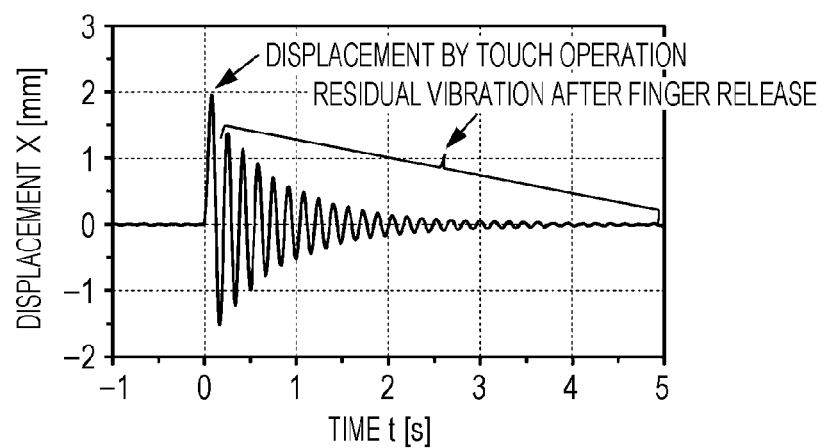
FIG. 2C is a graph illustrating an oscillatory waveform of the display unit during a touch panel operation, which is measured by the vibration measurement system illustrated in FIG. 2B.
Figure 10:
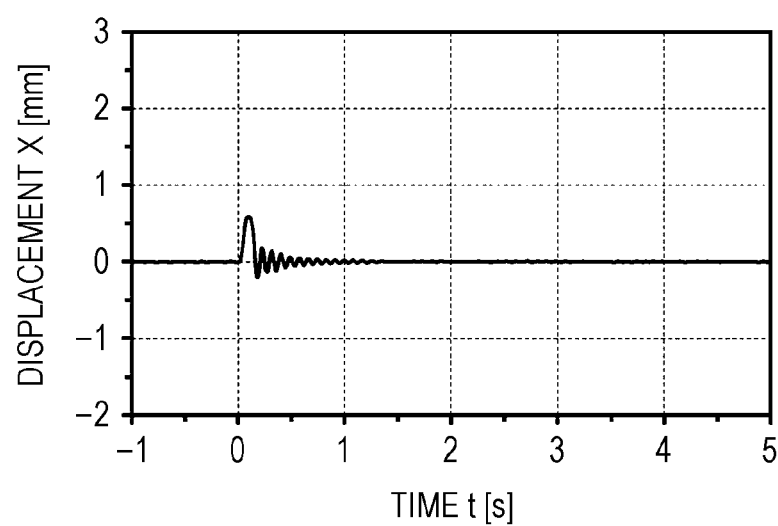
FIG. 10 is a graph illustrating an oscillatory waveform when the vibration of a display unit during an operation of the touch panel in the laptop personal computer including the hinge device according to the first example of the embodiment is measured by the vibration measurement system illustrated in FIG. 2B.

FIG. 10 is a waveform chart illustrating an oscillatory waveform when the vibration of the display unit 1D during a touch operation on the touch panel 1T in the laptop personal computer 1 including the hinge device 11 according to the first example of the embodiment is measured by the vibration measurement system illustrated in FIG. 2B. As can be seen from FIG. 10, the vibration of the display unit 1D is suppressed during the touch operation. More specifically, compared with the waveform chart in the comparative technology illustrated in FIG. 2C, in the laptop personal computer 1 including the hinge device 11 according to the first example of the embodiment, displacement caused by the touch operation is small and residual vibration after a finger is released is converged to not more than 1 second. Thus, the vibration is significantly reduced. Therefore, in the laptop personal computer 1 including the hinge device 11 according to the first example of the embodiment, operability is improved while achieving steadiness during touch operations. Note that, by adopting a piezoelectric element having a high response speed in the hinge lock mechanism, the vibration of the display unit can be suppressed with no time delay at the moment of touch operation.

Figure 11A:
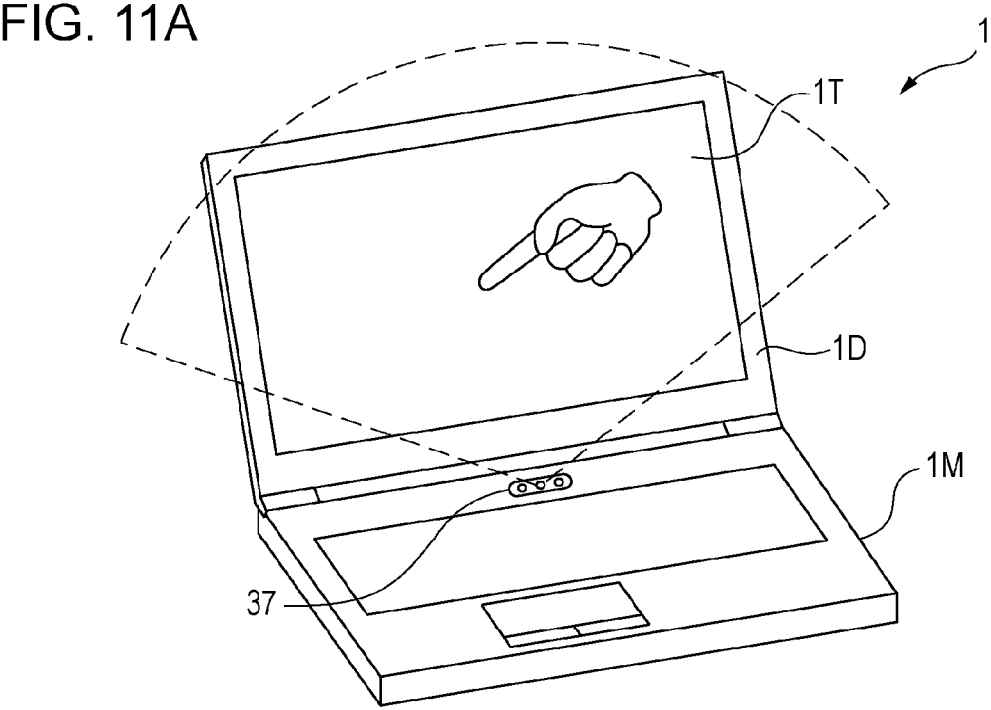
FIG. 11A is a perspective view of a laptop personal computer illustrating the location of an approach sensor in a hinge device according to a third example of the embodiment, which is mounted on a laptop personal computer including a touch panel.

FIG. 11A illustrates the location of an approach sensor 37 in a hinge device according to a third example of the embodiment, which is mounted on the laptop personal computer 1 including the touch panel 1T. The approach sensor 37 detects an object by emitting infrared light, for example, and receiving reflected light thereof. In the hinge device according to the third example, the approach sensor 37 is installed in the center of a portion, of the main body unit 1M, adjacent to the display unit 1D. Also, an optical component such as a lens is used to emit the infrared light in fan-like fashion toward the surface of the display unit 1D. The use of the approach sensor 37 enables detection of a finger approaching the touch panel 1T for a touch operation. The approach sensor 37 may emit ultrasonic waves.

Figure 11B:
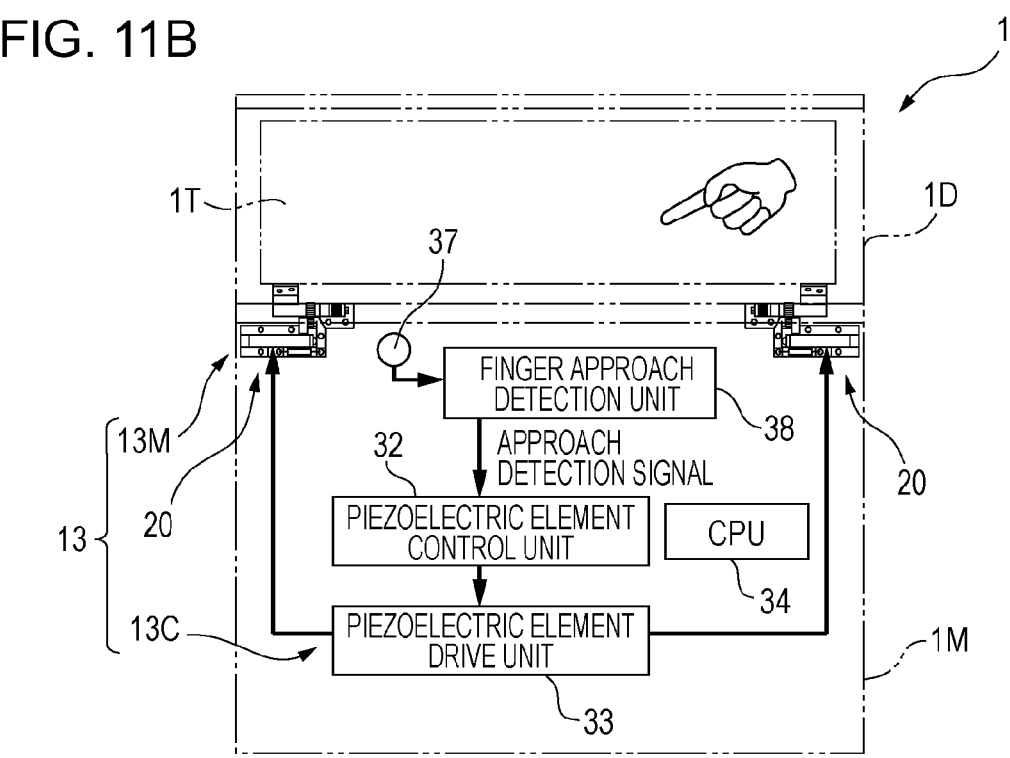
FIG. 11B is a block circuit diagram illustrating a configuration example of a control system in the hinge device according to the third example of the embodiment illustrated in FIG. 11A.

FIG. 11B illustrates a configuration example of a mechanism system 13M and a control system 13C in the hinge device 13 according to the third example of the embodiment illustrated in FIG. 11A. The mechanism system 13M has exactly the same structure as that of the mechanism system 11M in the hinge device 11 according to the first example. The control system 13C includes the approach sensor 37 illustrated in FIG. 11A, a finger approach detection unit 38, a piezoelectric element control unit 32 and a piezoelectric element drive unit 33. The approach sensor 37 is built into the main body unit 1M of the laptop personal computer 1 as illustrated in FIG. 11A.

An operation of the control system 13C controlling the mechanism system 13M in the hinge device 13 according to the third example is the same as the operation of the control system 11C controlling the mechanism system 11M in the hinge device 11 according to the first example. Therefore, the control of the mechanism system 13M by the control system 13C in the hinge device 13 according to the third example is the same as the control procedures described with reference to FIG. 6 or FIG. 7 except that the "touch detection signal" is replaced by an "approach detection signal". Thus, description of the control of the mechanism system 13M by the control system 13C in the hinge device 13 according to the third example is omitted.

Figure 12A:
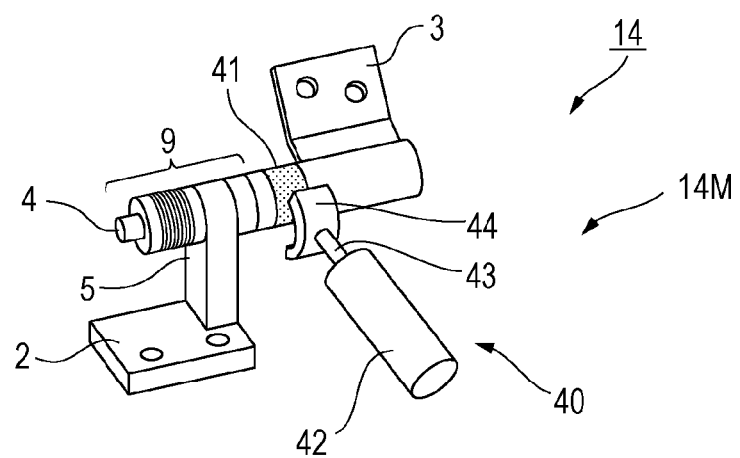
FIG. 12A is a perspective view of a mechanism system in a hinge device according to a fourth example of the embodiment, which is mounted on a laptop personal computer including a touch panel.

FIG. 12A illustrates a configuration of a mechanism system 14M in a hinge device 14 according to a fourth example of the embodiment, which is mounted on a laptop personal computer including a touch panel. In the hinge device 14 according to the fourth example, a hinge lock mechanism 40 includes: a rough surface 41 provided on a side of a hinge rotating shaft 4 in a display connector 3 in the hinge device 14; and an actuator 42 configured to move a rod 43 having a brake member 44 provided at its tip. The actuator 42 can be formed using a solenoid and a plunger or a stacked piezoelectric element to move the rod 43 back and forth relative to the actuator 42.

Figure 12B:
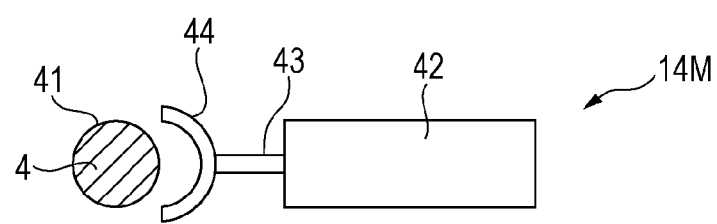
FIG. 12B is a side view illustrating a state where no power is conducted to the hinge device illustrated in FIG. 12A.
Figure 12C:
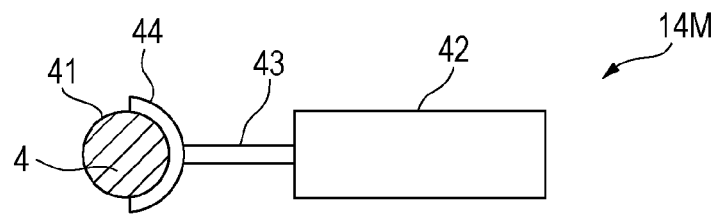
FIG. 12C is a side view illustrating a state where power is conducted to the hinge device illustrated in FIG. 12A.

An inner periphery of the brake member 44 coincides with the shape of an outer periphery of the rough surface 41 as illustrated in FIG. 12B. In a state where no power is conducted to the actuator 42, the inner periphery of the brake member 44 is located at a position distant from the outer periphery of the rough surface 41. When power is conducted to the actuator 42, the rod 43 is moved toward the display connector 3 by the actuator 42 and engaged with the rough surface 41, as illustrated in FIG. 12C, thereby suppressing the rotation of the hinge rotating shaft 4. If the same material as that of a brake shoe is used for the inner periphery of the brake member 44, braking force is improved. The hinge lock mechanism 40 in the hinge device 14 according to the fourth example may be configured to suppress the rotation of the hinge rotating shaft 4 in the display connector 3 in the hinge device 14 by restraining the side surface thereof. The structure of the hinge lock mechanism 40 is not limited to that of this example. Moreover, a displacement increase mechanism such as the pressure lever in the hinge device 11 may be provided.

Figure 13A:
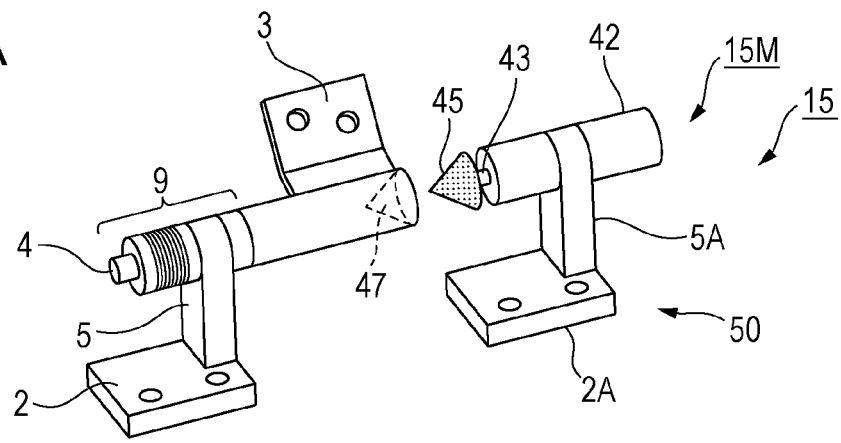
FIG. 13A is a perspective view of a mechanism system in a hinge device according to a fifth example of the embodiment, which is mounted on a laptop personal computer including a touch panel.

FIG. 13A illustrates a configuration of a mechanism system 15M in a hinge device 15 according to a fifth example of the embodiment, which is mounted on a laptop personal computer including a touch panel. In the hinge device 15 according to the fifth example, a hinge lock mechanism 50 includes: a conical hole 47 provided in an end surface of a hinge rotating shaft 4 in a display connector 3 in the hinge device 15; and an actuator 42 configured to move a rod 43 having a conical protrusion 45 provided at its tip. The actuator 42 can be formed using a solenoid and a plunger or a stacked piezoelectric element to move the rod 43 back and forth relative to the actuator 42. Moreover, the actuator 42 is held on a bracket 5A protruded from a main body connector 2A installed in the main body unit, and the axes of the rod 43 and conical protrusion 45 coincide with the axis of the hinge rotating shaft 4.

Figure 13B:
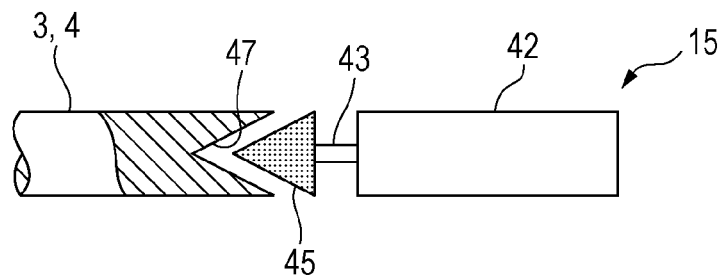
FIG. 13B is a side view including a partial cross-section, illustrating a state where no power is conducted to the hinge device illustrated in FIG. 13A.
Figure 13C:
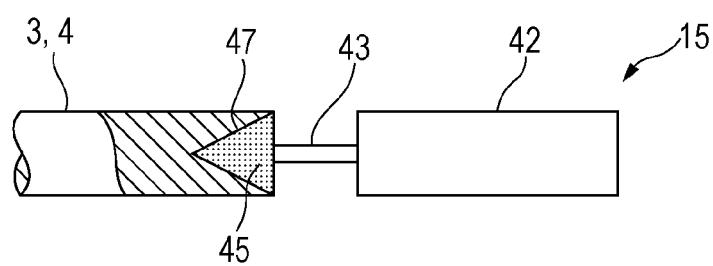
FIG. 13C is a side view including a partial cross-section, illustrating a state where power is conducted to the hinge device illustrated in FIG. 13A.

An outer periphery of the conical protrusion 45 coincides with the shape of an inner periphery of the conical hole 47 as illustrated in FIG. 13B. In a state where no power is conducted to the actuator 42, the outer periphery of the conical protrusion 45 is located at a position distant from the inner periphery of the conical hole 47. When power is conducted to the actuator 42, the rod 43 is moved toward the display connector 3 by the actuator 42 and the outer periphery of the conical protrusion 45 is engaged with the inner periphery of the conical hole 47, as illustrated in FIG. 13C, thereby suppressing the rotation of the hinge rotating shaft 4 in the display connector 3. If the same material as that of a brake shoe is used for the outer periphery of the conical protrusion 45, braking force is improved. The hinge lock mechanism 50 in the hinge device 15 according to the fifth example may be configured to suppress the rotation of the hinge rotating shaft 4 in the display connector 3 in the hinge device 15 by restraining the end surface thereof. The structure of the hinge lock mechanism 50 is not limited to that of this example. Moreover, a displacement increase mechanism such as the pressure lever in the hinge device 11 may be provided.

As described above, the following effects can be expected from a folding electronic device using the hinge device according to the embodiment.

(1) The vibration of the display unit can be suppressed during a touch operation to the touch panel of the display unit. Thus, operability of the laptop personal computer is improved while achieving steadiness during the touch operation.

(2) By adopting a piezoelectric element having a high response speed in the hinge lock mechanism, the vibration of the display unit can be suppressed at the moment of a touch operation to the touch panel. Thus, the steadiness can be achieved from the moment of the touch operation with no time delay.

(3) Since the hinge lock mechanism is in the OFF state when opening and closing the display unit relative to the main body unit, the display unit can be opened and closed with operation force equal to or less than that to be used in the conventional electronic device.

The embodiment has been described in detail above by referring to the preferred embodiment thereof in particular.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:
1. A hinge device used in an electronic device used by opening a second housing from a closed state to a predetermined angle relative to a first housing, comprising:
  a first housing connector configured to rotatably hold a hinge rotating shaft on the first housing;
  a second housing connector configured to fix the hinge rotating shaft to the second housing;
  a hinge torque generator provided in a connection between the first housing connector and the second housing connector and configured to generate a predetermined rotation torque between the hinge rotating shaft and the first housing connector;

a hinge lock provided on the first housing side and configured to restrain rotation of the hinge rotating shaft in response to input of a lock signal, the hinge lock including a first gear provided on the hinge rotating shaft and rotated in synchronization with the hinge rotating shaft, a second gear provided on the first housing side and continuously engaged with the first gear, and an actuator capable of restraining rotation of the second gear by applying pressure on a part of the second gear; and a controller capable of generating the lock signal to the hinge lock.

2. The hinge device according to claim 1, wherein a touch panel is provided in the second housing of the electronic device, and the controller generates the lock signal when it is detected that a finger of an operator of the electronic device touches the touch panel.

3. The hinge device according to claim 1, wherein a touch panel is provided in the second housing of the electronic device, an approach sensor is provided in the first housing, the approach sensor being configured to detect that a finger of an operator of the electronic device approaches the touch panel, and the controller generates the lock signal when it is detected that the finger of the operator of the electronic device approaches the touch panel.

4. The hinge device according to claim 1, wherein a touch panel is provided in the second housing of the electronic device, an opening and closing operation detector is provided on the sides of the second housing except for the side on which the second housing connector is provided, the opening and closing operation detector being configured to detect operations of opening and closing the second housing relative to the first housing by an operator of the electronic device, and the controller stops generation of the lock signal during detection of the opening and closing operations of the second housing relative to the first housing by the opening and closing operation detector.

5. The hinge device according to claim 4, wherein the opening and closing operation detector is a pressure-sensitive sensor disposed in an outer periphery of the second housing.

6. The hinge device according to claim 1, wherein the actuator performs a restraining operation upon receipt of the lock signal.

7. The hinge device according to claim 6, wherein the actuator includes a displacer configured to be displaced when the lock signal is inputted, and a pressure lever configured to increase a displacement amount of the displacer.

8. The hinge device according to claim 7, wherein a stacked piezoelectric element formed by alternately laminating piezoelectric elements and electrodes is used as the displacer.

9. An electronic device used by opening a second housing from a state of being closed by a hinge device to a predetermined angle relative to a first housing, the hinge device including:

a first housing connector configured to rotatably hold a hinge rotating shaft on the first housing, a second housing connector configured to fix the hinge rotating shaft to the second housing, a hinge torque generator provided in a connection between the first housing connector and the second housing connector and configured to generate a predetermined rotation torque between the hinge rotating shaft and the first housing connector, a hinge lock provided on the first housing side and configured to restrain rotation of the hinge rotating shaft in response to input of a lock signal, the hinge lock including a first gear provided on the hinge rotating shaft and rotated in synchronization with the hinge rotating shaft, a second gear provided on the first housing side and continuously engaged with the first gear, and an actuator capable of restraining rotation of the second gear by applying pressure on a part of the second gear, and a controller capable of generating the lock signal to the hinge lock.

10. An electronic device comprising the hinge device according to claim 9, wherein a touch panel is provided in the second housing of the electronic device, and the controller generates the lock signal when it is detected that a finger of an operator of the electronic device touches the touch panel.

11. An electronic device comprising the hinge device according to claim 9, wherein a touch panel is provided in the second housing of the electronic device, an approach sensor is provided in the first housing, the approach sensor being configured to detect that a finger of an operator of the electronic device approaches the touch panel, and the controller generates the lock signal when it is detected that the finger of the operator of the electronic device approaches the touch panel.

12. An electronic device comprising the hinge device according to claim 9, wherein a touch panel is provided in the second housing of the electronic device, an opening and closing operation detector is provided on the sides of the second housing except for the side on which the second housing connector is provided, the opening and closing operation detector being configured to detect operations of opening and closing the second housing relative to the first housing by an operator of the electronic device, and the controller stops generation of the lock signal during detection of the opening and closing operations of the second housing relative to the first housing by the opening and closing operation detector.

13. An electronic device comprising the hinge device according to claim 12, wherein the opening and closing operation detector is a pressure-sensitive sensor disposed in an outer periphery of the second housing.

14. An electronic device comprising the hinge device according to claim 9, wherein the actuator performs a restraining operation upon receipt of the lock signal.

15. The hinge device according to claim 14, wherein the actuator includes a displacer configured to be displaced when the lock signal is inputted, and a pressure lever configured to increase a displacement amount of the displacer.

16. An electronic device comprising the hinge device according to claim 15, wherein a stacked piezoelectric element formed by alternately laminating piezoelectric elements and electrodes is used as the displacer.

* * * * *